Patented Feb. 12, 1935

1,991,141

UNITED STATES PATENT OFFICE 1,991,141

PROCESS OF PREPARING CELLULOSE SOLUTIONS

Jan Cornelis de Nooij and Dirk Jan Gerritsen, Zutphen, Netherlands

No Drawing. Application January 6, 1933, Serial No. 650,586. In the Netherlands April 5, 1932

6 Claims. (Cl. 260—100)

Besides solutions of cellulose compounds, such as xanthate, nitrate and acetate of cellulose, one has also tried to spin solutions of cellulose in sulphuric acid, zinc-chloride, hydrochloric acid, rhodanides and the like. Up to now these attempts have not given the desired results.

The failure of these attempts, so far as the spinning of solutions of cellulose in sulphuric acid is concerned, is to be ascribed to the fact that sulphuric acid causes a saccharification of the cellulose. Up to now one has not succeeded in preparing a technically useful product from solutions of cellulose in sulphuric acid in an economical way, as the lowering of the concentration of the cellulose itself as well as the presence of decomposition-products of the cellulose have an unfavorable influence upon the quality of the final product.

When spinning cellulose solutions in acids one has tried to counteract the decomposition of the cellulose. Langhans has proposed, for a solution of cellulose in mixtures of phosphoric and sulphuric acid, the addition of phosphoric acid of 45%, and also the addition of alcohol, glycerine or the phosphoric, sulphuric and nitrogenic esters thereof. Further Langhans has proposed a method for preparing homogeneous cellulose solutions, according to which process the cellulose is first dissolved in sulphuric acid of 70–80%, after which the solution thus formed is diluted with weaker sulphuric acid (of 63 to 45%).

These processes possess the following disadvantages:

1. It is necessary to use large quantities of the acid which is diluted in order to decrease the concentration of the acid so that the aim in view is achieved to some extent, this causing necessarily a very important decrease of the concentration of the cellulose. In order to obtain a technically useful product a sufficient content of cellulose is necessary.

2. A very rapid saccharification takes place in the solution, products which can not be regenerated, such as glycose, being formed, which causes the concentration of the cellulose to vary during spinning, causing also a loss of the raw materials.

3. The cellulose which can still be regenerated will have already been decomposed to such an extent that the tensile strength of the final product is very unfavourably affected.

4. The solution has no constant viscosity as the same decreases in an unlimited way due to the saccharification.

5. The dimensions of the cellulose particles cannot be influenced as desired.

These disadvantages are removed by the invention.

The process according to the invention shows the characteristic feature that to the solution of cellulose in sulphuric acid is added such a proportion of water or of different substances or mixture of substances which are soluble in the solvent, that the concentration of the sulphuric acid in the spinning solution is less than 60% by weight, thus causing poly-ionic particles to be formed so that the now metastable solution is, no longer exposed to decomposition of the cellulose molecule. The solvent has now such a concentration that cellulose would not be dissolved therein. According to the invention the dissolving of the cellulose takes place in sulphuric acid of above 60% by weight; preferably a concentration of about 65% by weight is used. The dissolving and/or the subsequent treatments may be carried out under cooling and/or diminished pressure if desired.

The process according to the invention has, therefore, the following advantages:

1. The solution being no longer exposed to decomposition of the cellulose molecule, the contents of cellulose and the viscosity during spinning remain constant.

2. It is possible to carry out the production of the solution and the spinning thereof independently from each other so that it is possible to carry out the necessary after-treatments of the spinning solution, such as de-aerating, filtering and the like.

3. By the application of the process the spinning solution passes through a maturation stage which has an extraordinary favourable influence upon the tensile strength of the final product.

4. By the use of the less concentrated sulphuric acid, an undesired conversion is prevented when dissolving the cellulose, and also for instance water as a diluting means can be used, in connection with the fact that the heat evolved herewith, does not cause any damage.

It has appeared that in order to obtain the desired results according to the invention sulphuric acid is used in such a concentration that the cellulose is dissolved colloidally but that the percentage of sulphuric acid is as low as possible. In practice a solution of sulphuric acid of about 65% by weight is used for this purpose. The concentration of the sulphuric acid of the spinning solution (apart from the cellulose) according to the invention is between 50 and 60 percent by weight.

Starting from a solution of sulphuric acid of for instance 65% by weight one will use in practice a proportion of water between 30 and 8 kg. for every 100 kg. of this sulphuric acid.

As has been mentioned already, the sulphuric acid causes a saccharification of the cellulose. In order to obtain a quantitative insight in the saccharification an analysis was made with regard to the viscosity of solutions of cellulose in sulphuric acid of different concentrations. Starting with the supposition that the velocity of the decrease of the viscosity at a certain moment is proportional to the viscosity at that moment, the following equation has been deduced:

$$S = \frac{t_2 - t_1 \log 2}{\log v_1 - \log v_2},$$

in which $t_1$ and $t_2$ are the points of time at which the viscosities $v_1$ and $v_2$ have been measured and $S$ the time in minutes elapsing till the viscosity of the solution has been decreased to the half.

It is evident that the measurements must be carried out at constant temperature. The above stability-equation is of much use for practical investigations, especially since it is not necessary to take the several measurements immediately after dissolving. Although it is only necessary to carry out two measurements of the viscosity, in practice more viscosities are measured, and by means of graphical methods the values of $v_1$ and $v_2$ are determined which must be inserted into the above equation.

With the viscosity as a measure for the saccharification and by applying the stability-equation it is possible to follow to what extent a certain alteration in the composition of the solution causes the stability of the solution to be increased, i. e. the saccharification to be counteracted.

This equation gives an insight into the saccharification of solutions with concentrations of more than 60 percent by weight, but differences occur at lower concentrations which are obtained by adding for instance more water after the cellulose has been dissolved, these differences being greater as more water has been added after determining the viscosity.

A further examination showed this to be caused by a process which takes place simultaneously with the saccharification, i. e. the forming of a gel.

As has been remarked already the final concentration of the sulphuric acid which is applied depends upon the time which is necessary for the after-treatment of the spinning solutions, such as de-aerating, filtering, spinning, etc. During dilution until a metastable solution is reached a certain time for the further treatment is necessary. The stability during this time is constant, that is to say the cellulose content and the viscosity of the solution are maintained. One has to take into consideration the fact that the temperature and the cellulose content influence the velocity of the coagulation. Increase of temperature and of the cellulose content promote the forming of a gel.

At every concentration of the sulphuric acid below 60% by weight the solution attains, after a certain lapse of time, such a state of advanced coagulation that spinning is no more possible. This lapse of time is the shorter the lower the concentration is. The solution becomes more viscid due to the coagulation and in the end a complete gel is formed, in which no determination of the viscosity is possible. Therefore the final concentration is chosen such that the lapse of time up to the very large increase of the viscosity, is greater than that which is necessary for the after-treatment of the spinning solution before spinning. It has appeared that the influence upon the velocity of the decomposition of the cellulose is surprisingly large at the low concentrations of the sulphuric acid at which coagulation may occur. This is comprehensible if it is taken into account that by the forming of the poly-ionic particles the total surface of the dispersed particles is diminished.

In practice the time which lapses from the production of the solution till the increase of viscosity as mentioned above is determined for different concentrations of the sulphuric acid. One chooses that concentration of sulphuric acid which allows the after-treatments of the solution to be carried out within that time.

As a raw material for the process according to the invention several kinds of cellulose may be used, such as sulphite-cellulose, linters, cotton-wool, mercerized cellulose and such like raw materials as used in the artificial silk industry. This material is dissolved in sulphuric acid after being dried, bleached, or subjected to another desired preliminary treatment. Thereupon the above mentioned substances are added after which the solution is spun in water, diluted or not diluted alcohol in which acids, alkalies or salts or mixtures thereof may be dissolved; the solution before spinning may be de-aerated, filtered, or subjected to another after-treatment.

In order to make a comparison the following examples are given. Example $a$ being in accordance with the present invention and example $b$ not according to the invention.

(a.) 7½ kg. of sulphuric-cellulose are dissolved in 100 kg. of sulphuric acid of 65% by weight. Thereupon 16 kg. of water are added and the solution is kept at a temperature of 10° C. During the 8 hours which lapse before the coagulation, the solution can be spun very well, the cellulose content being constant.

(b.) 7½ kg. of sulphite-cellulose are dissolved in 100 kg. of sulphuric acid of 65% by weight, and the solution is kept at 10° C. without water being added. After 3 hours the solution is saccharificated in such a way that spinning is no longer possible.

Finally it has appeared that only the process according to the invention enables one to obtain a special dimension of the particles. When working with spinning-solutions, which are in a state of coagulation, it is possible to have the spinning-solution matured till the dimensions of the particles are the most favourable.

Indeed it has appeared that the tensile strength of a thread is considerably increased after the concentration of a sulphuric acid is reached at which the solution may be described as a metastable one.

What is claimed is,

1. The process of preparing cellulose solutions for use in manufacturing artificial products comprising artificial threads, films, bands, and the like, consisting in dissolving cellulose in sulfuric acid and diluting such solution by adding a substance which is soluble in the solution to make the same metastable, in such a quantity that the concentration of the sulfuric acid in the metastable spinning solution disregarding the cellulose is less than 60% but not lower than 50%.

2. The process of preparing cellulose solutions for use in manufacturing artificial products comprising artificial threads, films, bands, and the like, consisting in dissolving cellulose in sulfuric acid and diluting such solution by adding a mixture of substances which are soluble in the solution to make the same metastable, in such a quantity that the concentration of the sulfuric acid in the metastable spinning solution disregarding the cellulose is less than 60% but not lower than 50%.

3. The process of preparing cellulose solutions for use in manufacturing artificial products comprising artificial threads, films, bands, and the like, consisting in dissolving cellulose in sulfuric acid and diluting such solution by adding water to make the solution metastable, in such a quantity that the concentration of the sulfuric acid in the metastable spinning solution disregarding the cellulose is less than 60% but not lower than 50%.

4. The process of preparing cellulose solutions for use in manufacturing artificial products comprising artificial threads, films, bands, and the like, consisting in dissolving cellulose in sulfuric acid of about 65% by weight and diluting such solution by adding a substance which is soluble in the solution to make the same metastable, in such a quantity that the concentration of the sulfuric acid in the metastable spinning solution disregarding the cellulose is less than 60% but not lower than 50%.

5. The process of preparing cellulose solutions for use in manufacturing artificial products comprising artificial threads, films, bands, and the like, consisting in dissolving cellulose in sulfuric acid of about 65% by weight and diluting such solution by adding a mixture of substances which is soluble in the solution to make the same metastable, in such a quantity that the concentration of the sulfuric acid in the metastable spinning solution disregarding the cellulose is less than 60% but not lower than 50%.

6. The process of preparing cellulose solutions for use in manufacturing artificial products comprising artificial threads, films, bands, and the like, consisting in dissolving cellulose in sulfuric acid of about 65% by weight and diluting such solution by adding water to make the same metastable, in such a quantity that the concentration of the sulfuric acid in the metastable spinning solution disregarding the cellulose is less than 60% but not lower than 50%.

JAN CORNELIS DE NOOIJ.
DIRK JAN GERRITSEN.

Certificate of Correction

Patent No. 1,991,141. February 12, 1935.

JAN CORNELIS DE NOOIJ ET AL.

It is hereby certified that errors appear in the printed specification of the above numbered patent requiring correction as follows: Page 2, first column, line 15, strike out the equation and insert instead $$S = \frac{(t_2-t_1)\log 2}{\log v_1 - \log v_2};$$

and second column, line 38, for "sulphuric-cellulose" read *sulphite-cellulose* and that the said Letters Patent should be read with these corrections therein that the same may conform to the record of the case in the Patent Office.

Signed and sealed this 30th day of April, A. D. 1935.

[SEAL] LESLIE FRAZER,
*Acting Commissioner of Patents.*